United States Patent Office 3,250,329
Patented May 10, 1966

3,250,329
CONSOLIDATION USING FREE RADICALS
Michael Prats, Houston, Tex., assignor to Shell Oil Company, New York, N.Y., a corporation of Delaware
No Drawing. Filed May 13, 1963, Ser. No. 280,111
1 Claim. (Cl. 166—29)

This invention relates to well bores formed in earth formations and, more particularly, concerns those drilled into loose or incompetent formations. In one of its more specific embodiments, the invention pertains to a method for consolidating incompetent formations penetrated by a well bore so as to inhibit or totally prevent earth particles from being carried into the well bore by effluent, such as petroleum, produced from the earth formation.

A typical difficulty encountered in producing effluent from an incompetent earth formation through a well therein is that earth particles are carried into the well with resultant collapsing or sloughing of the well bore wall. To avoid this difficulty, it is necessary to use some device to restrict sloughing, such as a perforated pipe liner, a gravel pack, or a tubular screen. Each of the latter devices and their applications are well known in the well producing art. These devices, however, have the disadvantage of either becoming plugged with particles after a period of use or of not excluding the finer formation particles intruding into the well from the formation being produced. In the latter case, the well becomes plugged with fine formation particles and thus requires cleaning and possible shut-down to maintain productivity.

In the past, it has been proposed to consolidate incompetent formations by injecting a thermo-setting resin into a portion thereof to act as a binding agent. One of the shortcomings of this method is that it requires the utilization of a large amount of resin to obtain the desired and necessary binding of the formation. As a result, the method is relatively expensive to execute and the permeability of the formation treated may be materially reduced. The latter factor is obviously detrimental in most instances, since it decreases the flow area through which effluent may be removed from the formation into the well bore.

It has also been proposed to consolidate incompetent formations by subjecting them to a temperature which is sufficiently high to melt and fuse the formation constituents, e.g., the silica sand particles. The main disadvantage of this method is that most components of natural subterranean formations fuse at such high temperatures that the method requires the use of temperatures which are considerably above those which can be practically obtained. For instance, if the subterranean formation is one of predominantly silica sand particles, the temperatures required for effecting consolidation by melting and fusing would be in the order of 1500° C. to 1600° C., which is the temperature range in which pure silica melts. Such extremely high temperatures are clearly difficult to produce and even more difficult to maintain.

Yet another method of consolidating incompetent formations is that of carbonizing liquid hydrocarbons contained therein. In this method, the formation is exposed to elevated temperatures so as to effect carbonization or coking of the hydrocarbons therein. The coke thus formed acts as a binder to hold the formation in an integral consolidated mass. This method has the disadvantage that it requires heating for an extended period to effect thermal decomposition of the hydrocarbons in the formation to the desired form. In addition, the method frequently requires the use of a downhole heater either to heat the formation directly to the desired temperature or to initiate underground combustion to obtain the desired temperature. It is noted that the hydrocarbons carbonized in this method generally are in the form of liquids and thus have a tendency to flow within the formation upon the application of heat. Specifically, convection currents created by the heat function to move fluid hydrocarbons away from the heated zone desired to be consolidated before the fluid is immobilized by coking. Thus, it can be seen that this method often proves ineffective where the hydrocarbon desired to be coked is in an initial state of low viscosity.

Still another method heretofore suggested comprises the introduction of a glazing material (e.g., lead oxide) into an unconsolidated formation to effect its consolidation. In this case, the introduction of the glazing material is followed by subjecting the formation to an elevated temperature which fires the glazing substance in order to bind loose particles or grains of the formation into a more solid form. One of the defects of this process resides in the necessity of introducing a liquid containing glazing material into the formation, which presupposes that the latter is of subtsantially uniform permeability to permit a relatively uniform and even penetration of the glazing material. This, obviously, is not the case in a large number of instances.

Although other consolidation methods than those enumerated above have been developed, one or more of the shortcomings set forth above generally are encountered in the application of these methods. These shortcomings are encountered because most, if not all, consolidating processes rely on at least one of the steps enumerated in the above processes. Namely, these consolidation processes generally include liquid injection and/or heating steps.

It is, therefore, an object of the present invention to avoid the defects of the prior art processes and to provide an improved method for consolidating loose or incompetent subterranean formations. Still other objects and advantages will become apparent from the following description in which the present invention will be described, by way of illustration and example.

It has been found that the above and other objects may be attained by reacting oils within a formation desired to be consolidated with free radicals to produce heavy cokelike materials. In one of its broader embodiments, the present invention may be stated to reside in a process in which a formation which contains a liquid hydrocarbon is reacted with free radicals so as to affect polymerization and thus form a cokelike binder to hold the loose formation as an integral, but permeable mass. It is noted that the liquids polymerized may consist of those naturally present in the formation or of other oils, e.g., mineral or fatty oils, which may have been artificially introduced into the formation. More specifically stated, the present invention resides in a process which includes the step of injecting a source of free radicals into an oil-containing formation (e.g., an oil-bearing loose sand formation) to be consolidated by polymerization of the oil present therein. Upon injection, the source of free radicals reacts with the oil and any water present in the formation to create free radicals, which in turn react with the oil to perform a polymerization function.

Preferably, the free radicals polymerize the oils to a cokelike material which functions to consolidate the formation reacted into a porous consolidated mass of rigid character. However, in some instances the oils may only be polymerized to an extent where their viscosity is substantially increased, but a rigid material is not formed. In the latter case, the so-reacted oils may be subjected to high temperatures in order to coke the formation into a permeable consolidated mass. To effect this coking, the temperature of the formation may be elevated by any of the means well known in the art, such as downhole heaters and/or in-situ combustion. It is noted that coking of the formation with heat in this manner differs substantially from conventional coking procedures, as developed above, in that the oils are polymerized prior to the coking process. This polymerization increases the viscosity of the hydrocarbons and thus minimizes driving of oils from the formation desired to be consolidated by convection currents induced by the heat.

The polymerization of the oils in a loose formation should preferably be affected under such conditions that fluid hydrocarbons or other oils within the formation will be converted to a material which forms a coke matrix to consolidated the incompetent formation. The operating conditions necessary for producing this coke matrix will vary within wide limits depending on a number of factors, such as; the type of formation to be consolidated, the thickness desired to be consolidated the type of oil (e.g., liquid hydrocarbon) material which is to be polymerized to a cokelike material, the concentration of the source of free radicals, the presence or absence of catalysts, etc. Generally, in order to obtain optimum results, it is preferable to first determine the polymerization conditions, including temperature and duration, which will cause the particles of the loose formation to be converted to the desired integral porous mass by the formation of the desired cokelike material within the spaces between the grain particles. After these conditions have been determined, polymerization can be conducted through the use of free radicals within the unconsolidated area of the formation which is in communication with a well bore extending thereinto. In this way, the area of the formation in communication with the well bore can be consolidated and upheld.

The optimum source of free radicals to be used in the polymerization of hydrocarbons within a formation desired to be consolidated may be determined by employing a variety of experimental techniques. For example, the formation may be cored to obtain core samples which may be subjected to various sources of free radicals under conditions of temperature, pressure, oxygen concentration and time that are either naturally present within the formation or could be artificially induced therein. As an alternative, similar tests could be conducted upon artificially prepared samples which are constructed of inorganic particles having characteristics corresponding to those of the formation desired to be consolidated and contain therein kinds and amounts of oils corresponding to those present in the formation. As another alternative, tests to determine polymerization by free radicals may be conducted in-situ in the formation surrounding a well bore by subjecting portions of the formation to various sources of free radicals and the determining whether have resulted in the desired degree of formation consolidation. The results may be determined by side wall coring of the formation after the tests or by producing the well and determining whether sand particles are still sloughing into the well and, therefore, appearing in excessive amounts in the effluent produced therefrom.

It is noted that the aforediscussed tests may also be utilized to determine whether polymerization by free radicals in itself will be sufficient to consolidate a formation to the desired degree. If the desired degree of consolidation cannot be so effected, the test may be extended to determine the consolidating effects that may be accomplished by subjecting the formation to elevated temperatures subsequent to the polymerization reaction. In addition to determining the effect of subjecting the formation to elevated temperatures, these tests should also be carried out to an extent sufficient to determine the optimum conditions of temperature and pressure which produce the desired degree of consolidation.

The above tests may also be extended to determine whether it is desirable to inject oils into the formation prior to the application of the application of the polymerization process. The latter injections may prove particularly desirable, if not absolutely necessary, where the formation in its initial state does not naturally contain sufficient or proper hydrocarbons to facilitate effective consolidation through polymerization. In this case, the tests should also preferably include a determination of the particular type of oils which produces optimum consolidation when used in the polymerization process under the conditions present in the formation desired to be consolidated.

In general, the free radical reactions of the present invention are created by injecting a source of free radicals into the formation desired to be consolidated. Upon entering the formation the source of free radicals reacts with the oils and any water therein to liberate free radicals which, in turn, function to polymerize the oils within the formation. It is noted that it is preferable to create free radicals within the formation by the injection of a source material, rather than to attempt to inject free radicals directly into the formation. The latter conclusion is drawn from the fact that free radicals generally have short half-lives and, as a result, would usually be dissipated on route to injection into the formation if such a direct injection attempt were made. Typically, the sources of free radicals of the present invention take the form of highly active oxidants, although the invention is not intended to be limited to use with such oxidants. Suitable materials as sources of free radicals in the present invention include; nitrogen dioxide, nitric acid, hydrogen peroxide, oxygen, ozone or mixtures of these materials or other like materials of this class. When these materials react with oils, such as crude oils, there is always a liberation of heat that may or may not be accompanied by the formation of carbon oxide gases. When all the reacted oxygen does not form carbon oxide gases, the remaining oxygen is taken up by the oil molecules. The effect of the latter type oxygen crude reaction is to polymerize the oil, thus making it essentially more viscous. The degree of polymerization, of course, varies with the total amount of oxygen reacted on the oil. Experimental evidence shows that the polymerization is more complete with increasing amounts of reacted oxygen and, thus, increased amounts of reacted oxygen function to polymerize the oil to a more rigid material. When an excess of source of free radical is used, all of the oil in the area of the free radical reaction is essentially reacted to a hard, polymer, with the fast temperature increases accelerating the overall process. The excess source of free radicals can be introduced in one batch; in a number of injections, each of smaller amounts; or continuously at low rates and/or concentrations.

It is recognized that, under certain conditions, the injection of reagents, such as the sources of free radicals of the present invention, into crude-bearing formations may function to reduce the viscosity of the crudes rather than polymerize them into a cokelike material. Specifically, when the amount of oxygen available for reaction per unit weight of crude is limited, the overall effect may be reduction in viscosity of the crude due to the temperature rise resulting from the reaction. In this case, the rigidifying effect of the polymerization process is outweighed by the temperature rise resulting from the process. The effect of lowering the viscosity of a crude by polymerization in this manner is not, however, contradictory to the process of the present invention, since this effect is accomplished under conditions where the amount of oxygen available for the polymerization process is limited, thus differing material from the process of the present invention.

From the above discussion, it can be seen that the amount of free radicals available should be controlled to attain best results in the process of the present invention. Therefore, in the above-enumerated tests wherein the effects of various free radicals were determined, it is also necessary to determine the optimum amount of said free radicals required for the desired consolidation. In actuality, the amount of the source of free radicals used, as well as the free radicals in themsleves, would be determined to obtain these optimum results.

In the application of the process of the present invention, it is assumed that the formation desired to be consolidated is initially penetrated by a borehole extending to the surface of the earth. With the borehole so formed, the producing formation therearound can be tested to determine its characteristics and the optimum manner in which to apply the consolidation technique of the invention. Typically, these tests may include subjecting samples of the producing formation or samples corresponding to the producing formation to a series of fluids which acts as a source of free radicals. These tests are utilized to determine the most desirable source of free radicals to be used in the application of the invention. After the tests are so conducted and the free radical to be used has been chosen, the borehole is prepared for application of the source of free radicals to the producing formation.

Preferably, in preparing a well for the introduction of the source of free radicals a tubing string is run into the borehole and down to the formation desired to be consolidated. The section of the borehole adjacent to the portion of the formation desired to be consolidated is then pumped clean and isolated from the balance of the borehole by, for example, placing a packer above the slotted or open lower end of the tubing string adjacent to said portion. The tubing string and the annular space between the tubing string and the protective casing may be utilized to circulate fluids and out of the isolated section of the borehole and the surrounding formation.

If sufficient liquid hydrocarbons to effect the desired consolidation by polymerization are not present in the formation, oil will be introduced at this time prior to the introduction of the source of free radicals. Once the formation contains sufficient oil for the polymerization consolidation process, whether naturally present or artificially induced by injection, the source of free radicals is introduced into the formation through the conduits extending through the borehole and the isolated section of the borehole at the end of tubing string. Prior to the introduction of the source of free radicals any excess oil within the isolated section of the borehole and the formation therearound is preferably displaced. With the source of free radicals introduced into the formation, the free radicals are allowed to react within the formation to a degree sufficient to effect its consolidation by polymerization. The extract time required for this reaction is determined experimentally, as was developed previously. Where desirable, after the formation has been consolidated by the free radical reaction, any excess of the source of free radicals remaining in the isolated portion of the borehole may be removed. At this point, an alkaline fluide may be pumped into the well through the conduits and injected into the treated portion of the formation of neutralize acidic materials produced by the free radical reaction.

With the formation so consolidated and neutralized, the well is condition to produce in the conventional manner. If production from the well indicates that consolidation was inadequate, the present invention has the advantage that it may be repeated. In the case where the formation has actually had hydrocarbon produced therefrom, sufficient liquid hydrocarbons will generally be available in the area of the formation desired to be additionally consolidated to support the polymerization reaction. However, if sufficient liquid hydrocarbons are not present, oil may be injected prior to the retreatment.

If tests, whether in-situ in the formation or in the laboratory, indicate that the ambient conditions present in the formation to be consolidated will not support the desired reactions, these conditions may be varied artificially. Specifically, the portion of the formation desired to be consolidated may be pressurized and/or heated by any conventional means prior to and/or during the application of the source of free radicals. It is noted, however, that such artificially induced conditions will not generally be necessary.

*Example of unheated consolidation process*

A well is completed into a shallow Miocine sand formation located at a depth of 1000 feet and having an ambient temperature of 100° F. and pressure of 300 p.s.i. Core samples of the formation indicate a porosity of 0.25 and oil and water contents of respectively 0.65 and 0.35. Tests in which samples are subjected to various sources of free radicals (namely, air, $NO_2$, $NHO_3$ and $H_2O_2$) under conditions of temperature and pressure corresponding to those attainable in the formation indicate the feasibility of consolidation by free radical reaction. These tests indicate that $HNO_3$ functions to most effectively promote radical reactions which functioned to consolidate the formation. Thus $HNO_3$ is preferred as the source of free radicals to be used to consolidate this producing formation. In addition, the tests indicate that injecting a slug of about 13 bbls. of concentrated $HNO_3$ into the formation and shutting in the well for about 3 hours is sufficient to effectively consolidate a five foot interval of the formation.

In treating the formation encountered by the well, a packer is run in on a tubing string and set above the formation to be consolidated in order to isolate the section of the borehole adjacent to said formation. Prior to setting the packer, the isolated section of the borehole is pumped clean by circulating oil through the tubing string and annulus. After setting the packer and displacing any excess oil within the isolated section of the borehole and formation, the $HNO_3$ is pumped through the production string and forced through the isolated section of the borehole and into the producing formation. After the $HNO_3$ is forced into the formation, it is allowed to soak therein for a period of about 4 hours to react to produce the desired polymers and resultant consolidation. The soaking period is terminated by removing any remaining $HNO_3$ from the tubing string and the isolated section of the borehole and by pumping about 15 barrels of caustic solution containing a stoichiometric excess based on the amount of acid used into the formation to neutralize the well and the adjacent formation. The caustic solution is conveniently injected as a slug separated from the $HNO_3$ by an oil slug proportioned to fill the section of the borehole that is isolated by the packer. At this point, the consolidation process is complete and the well is placed on production.

It is to be understood that the above example is intended for the purpose of illustration only. In a formation deficient in consolidatable oil, the above procedure could be modified by including an oil injection step, as previously developed, prior to the injection of the source of free radicals. Furthermore, the process could be reapplied to the same portion of the formation.

The present invention can also be used to consolidate hydrocarbon producing formations wherein it is impractical or impossible to polymerize liquid hydrocarbons in the formation to a rigid cokelike material, although situations such as these are not known at present. Such a situation might occur where the ambient temperature and pressure conditions in the formation are insufficient to promote the desired free radical and polymerization reactions and where the use of artificially induced conditions is impractical. It might also occur where the hydrocarbons naturally present in the formation will not polymerize to a rigid cokelike material and it is impractical to replace these hydrocarbons with substitute oils capable of being polymerized to a rigid cokelike material.

However, in cases where the polymerization process of the present invention cannot be used to completely consolidate a producing formation, the process may be carried out in the manner previously described in order to polymerize hydrocarbons within the formation to a viscous cokelike material. In this viscous state the hydrocarbons may then be thermally coked to a rigid material by the application of heat through means of, for example, a downhole heater or in-situ combustion. Increasing the viscosity of the hydrocarbons prior to coking with heat has the advantage that hydrocarbons are less subject to be driven away from the heated zone by convection currents. Furthermore, polymerizing the hydrocarbons to a less fluid state prior to the application of heat for coking has the advantage that the amount of heat required for coking is minimized.

The application of the present invention for thermal-coking differs from that previously described only in that the free radicals do not polymerize the hydrocarbons within the formation desired to be consolidated to a rigid material, but rather merely increase the viscosity of these hydrocarbons. Naturally, in addition to this difference the thermal-coking embodiment of the invention includes the additional step of heating the formation subsequent to the free radical and polymerization process. As was mentioned previously, heating may be accomplished by any of several means, such as through utilization of a downhole heater or in-situ combustion.

To summarize, it is noted that the present invention provides a means of effectively consolidating producing hydrocarbon formations penetrated by boreholes. Consolidation is effected by free radical coking used either alone or in combination with thermal-coking. The resultant consolidated formation proves ideal to prevent loose sand from intruding into the borehole during the production of hydrocarbons while also permitting the free flow of the desired hydrocarbons. The latter condition results from the fact that a coke matrix is formed during the consolidation process, which matrix is permeable and thus permits the flow of hydrocarbons therethrough. The permeable nature of the consolidated formation results from the fact that the coked hydrocarbons function to cement the granular aggregates of the formation together only at their contacts. Furthermore, it is believed that permeability also results because water vaporized during the free radical reactions functions to form passages through the consolidated coked formation.

In the event that permeability impairment of the producing formation is appreciable, or the oil is polymerized rigidly but the sand is not adhere to the oil, the following additional steps can be employed:

(1) Precede the injection of the source of free radicals with a solvent, such as an alcohol slug, to remove both oil and water from the formation to be consolidated. The solvent may contain an oil or surfactant to make the sand oil wet.

(2) Inject oil into the formation. If the formation has not been made oil wet prior to this, add an oil-wetting agent to the oil.

(3) Displace the excess oil by gas injection.

(4) Inject the source of free radicals and proceed in the manner described previously.

In this way, the polymer film will be attached to the sand grains and the permeability will be high.

To conclude, it is noted that the present invention is not intended to be limited to the specific embodiments and the example set forth in the previous discussion. For example, the application of the invention may be repeated in stepwise fashion throughout the entire depth of a formation in order to effect consolidation in relatively deep formations that are impractical to consolidate in a single step. Furthermore, in such stepwise applications, it is anticipated that situations may occur where it is desirable to use both the unheated consolidation process and the thermal-coking consolidation process in alternate steps. It is also anticipated that the source of free radicals utilized in any of the applications of the present invention may be introduced into a borehole leading to a formation in forms other than the liquid slug specified in the example. Specifically, situations may arise wherein it is desirable to introduce the source of free radicals as a gas. The latter type of introduction may be advantageous where it is desirable to consolidate a large zone of formation or a relatively impermeable formation. Additionally, in any of the embodiments of the invention, artificially induced conditions of temperature and/or pressure may be applied to the formation to be consolidated to facilitate the desired reactions and resultant polymerization. Therefore, various changes in the details of the described processes may be made, within the scope of the appended claim, without departing from the spirit of the invention.

I claim as my invention:

A method of consolidating portion of an oil-bearing formation immediately surrounding a borehole by the use of free radicals comprising:

(a) injecting at least one fluid which produces free radicals into an oil containing sample corresponding essentially to the formation to be consolidated under the conditions which are present in said formation;

(b) selecting a fluid which produces free radicals and set of conditions that produce a reaction with the oil within said sample and that causes said oil to polymerize to a solid material cementing said oil containing sample into a porous consolidated unit;

(c) injecting said selected fluid into the portion of said oil-bearing formation immediately surrounding the borehole which is to be consolidated;

(d) reacting said fluid with the oil within said portion of said formation under said conditions in said formation; and (e) subsequently pumping an alkaline fluid into said portion of said formation to neutralize any acidic materials therein after said selected fluid has polymerized said oil therein cementing said portion of said formation into a porous consolidated unit.

References Cited by the Examiner

UNITED STATES PATENTS

| | | | |
|---|---|---|---|
| 2,804,145 | 8/1957 | Holbrook | 166—42 |
| 2,863,510 | 12/1958 | Tadema et al. | 166—38 |
| 2,906,340 | 9/1959 | Herzog | 166—39 |
| 3,055,425 | 9/1962 | Kerver et al. | 166—29 |
| 3,070,159 | 12/1962 | Marx | 166—25 X |
| 3,121,462 | 2/1964 | Martin et al. | 166—29 |
| 3,134,435 | 5/1964 | Wyllie | 166—25 |
| 3,172,468 | 3/1965 | Watson et al. | 166—25 |

CHARLES E. O'CONNELL, *Primary Examiner.*

S. J. NOVOSAD, *Assistant Examiner.*